Patented Oct. 20, 1936

2,057,668

UNITED STATES PATENT OFFICE 2,057,668

DYE MIXTURE

Wiley Paul Bolen, Savannah, Ga., assignor to Dusseldorf Chemical Company, Savannah, Ga., a corporation of Delaware No Drawing. Application May 16, 1934, Serial No. 725,991

4 Claims. (Cl. 8—6)

This invention relates to a dye mixture, and is useful in connection with both sulphur colors and vat colors. By "sulphur colors", I mean any of the usual commercial sulphur dyes including those wherein sodium sulphide is now used in the dyeing process as a reducing agent. By "vat colors", I mean any of the conventional dyes, including indigo, and wherein the dyeing process is now accomplished with the use of sodium hydrosulphite as the reducing agent.

I have discovered that a stable dye mixture can be produced consisting of a dye in unreduced insoluble state, and a carbohydrate, for example, invert sugar, capable of reacting in the presence of an alkali in the dye bath to reduce the dye to its soluble leuco state and prevent premature oxidation of the dye in the bath. The product will be made in paste or powder form and is readily available for use by the dyer.

By "premature oxidation", I mean that the dye is maintained in its leuco state in the bath by reason of the conditions of reduction produced by the reaction of the carbohydrate and the aqueous alkaline solution. Briefly, no oxidation is observed when the article being dyed is removed from the dye bath, i. e., there is a total absence of spotting or streaking.

The product of the present invention, as stated, is stable, and may be shipped and stored for long periods of time. Moreover, the concentration does not vary, since the invert sugar has the property of holding the water in the case of the paste for indefinite periods.

The product when used by the dye consumer is added to a suitable alkaline bath, or the alkali is added to the dye bath, whence the reduction of the dye takes place and a satisfactory solution free from any premature oxidation is obtained.

In the case of sulphur and vat colors wherein sodium sulphide, as well as sodium hydrosulphite have heretofore been considered practically indispensable, there has resulted a tendering of the goods which is highly objectionable. With the present invention, both of these reducing agents are eliminated; I find that the reduction of the dye will take place by means of the reaction between the carbohydrate and the alkali without any injury to the most delicate threads, for example, of textiles or paper.

While I preferably use water as the dye bath medium, this medium may also have mixed with it or be diluted by a suitable finishing material, such as soap or oil, as understood in the art.

An important feature of the present invention resides in the use of invert sugar. By "invert sugar", I mean sucrose, subjected to a suitable inversion process by reaction with an acid. I prefer, however, to accomplish the inversion by means of an organic or edible acid, such as tartaric acid, since I find that the inversion product so obtained is particularly applicable for association with a dye in producing the mixture of the present invention. Moreover, the invert sugar is a pure product, and will be used, therefore, very efficiently as to quantity.

The use of a dye mixture consisting of an invert sugar and a dye is advantageous in the case of sulphur colors and vat colors, which tend to oxidize rapidly, particularly in the bright blues. In fact, because of the perfect reduction obtained with the present invention, the colors are somewhat brighter and somewhat deeper. For this reason, it is possible to use less color and save dyestuffs in connection with sulphur and/or vat colors when it is necessary to match a given or lighter shade.

In carrying out the invention, I preferably use refined sucrose or sugar, and subject the same to a suitable inversion process. The acid employed for accomplishing inversion may be sulphuric or hydrochloric, but I preferably use one of the organic acids, such as tartaric, maleic, or citric.

The invert sugar is made by the treatment of raw or refined sugar, either beet or cane, with various acids, as above mentioned. The sugar solution is heated to the desired temperature, and then the acid is added. The temperature is held constant until inversion is completed.

I produce my mixture in two forms, namely, (a) as an amorphous powder, and (b) as a paste.

In order to produce a powder product, I proceed in several ways. For example, the unreduced dyestuff in initial paste condition or formed into a paste, with water or other suitable inert liquid body is mixed with the required amount of invert sugar, either as a syrup, or a dehydrated invert sugar in plastic form. This paste mixture will be dried at a low heat or in vacuum to substantial dryness, i. e., to the form of a slag or coke. Thereafter, this dehydration product is powdered by any suitable means, such as grinding, to produce an amorphous powder mixture.

Again, the unreduced dyestuff in powder form may be added to the invert sugar syrup or melted plastic invert sugar, and the mixture reduced at a low heat or in vacuum to the slag or coke form. The slag or coke will be reduced as described to an amorphous powder.

In forming the paste, the dye in initial paste condition or as a mixture of the dyestuff powder and water or other liquid body is employed. To this paste may be added other materials, such as sulphonated castor oil or similar diluents. The dye is dispersed in the liquid body or any suitable inert wetting agent, and to the paste is added the invert sugar syrup or the dehydrated invert sugar in plastic form. If necessary, the mixture will then be concentrated to any desired extent at low heat or in vacuum. Similarly, the paste products referred to heretofore in making the powder may be likewise concentrated, if desired, or used in their original paste condition or consistency.

The proportions of dye, invert sugar and liquid body, as the case may be in the powder or paste, will necessarily vary with the product being manufactured and the particular character of the dye.

Either the powder or paste will be suitably packaged and shipped to the dye consumer for use in the manufacture of the dye bath and is immediately available.

The product is stable in either case, and does not lose its concentration. This is due, for example, in the case of the paste, to the ability of the inversion product to retain the moisture for indefinite periods of time.

In preparing the dye bath, a suitable solution of alkali is formed in the vat to which the mixture may be added, control, of course, being exercised in regard to the degree of alkalinity of the bath and the quantity of the dye mixture which is included. On the other hand, the mixture will be added to the bath, and thereafter the alkali will be added thereto.

In referring to alkali, I include caustic soda, potassium hydroxide and sodium or potassium carbonate or mixtures of these. I do not mean to be limited to these particular compounds, since I will use any alkali earth metal or alkali earth compound which is capable of reacting with the invert sugar in the bath to produce reduction of the dye to its leuco soluble state and which will prevent premature oxidation in the bath.

There takes place in the bath a reaction between the pure invert sugar and the alkali, such that the insoluble, unreduced dye is reduced and is rendered soluble in the bath. At the same time, the reduction which takes place is sufficient to offset any tendency for premature oxidation of the dye on the material being dyed to occur, so that the material is free from any streaks or faults.

Furthermore, the material being dyed, for example, textiles, is not weakened or tendered by the reaction, for the reason that the heretofore employed sulphides and hydrosulphites are unnecessary.

In the case of vat and sulphur dyes, the present invention assures somewhat brighter and somewhat deeper shades, so that more color is present on the material being dyed. This is due to the perfect reduction which takes place and to the absence of any effects of premature oxidation. Likewise, if lighter shades are required, these can be easily accomplished by the reduction of the quantity of dye employed, for example, in the case of sulphur colors, as high as 30% of dye may be conveniently saved.

It is to be noted that I do not require the use of the customary sodium hydrosulphite, since I find that the invert sugar in conjunction with the alkali makes the use of such an agent unnecessary. This is particularly important in the case of rayon materials, which are dyed just below the boiling point, which may be substantially 99° C., where I find that my improved dye mixture in association with an alkali is effective at the high temperatures, whereas the hydrosulphite, under such conditions, would be at its point of minimum value as a reducing agent.

I also make a dye powder or dye paste mixture in the manner described herein from dextrose or maltose, using either the heavy syrup, or the powder or crystals in which these carbohydrates are obtainable; also pure glucose in its syrup or plastic form. In the case of powdered or crystalline dextrose and maltose, I form the mixture also by mixing the powdered dyestuff with the powdered or crystalline carbohydrate.

In referring to a dye in the claims, I mean to include sulphur and vat colors and mixtures thereof, and the term carbohydrate likewise includes the members of this group of compounds and combinations or mixtures thereof.

I claim:

1. A dye mixture for use in bath dyeing comprising a dye in unreduced insoluble state and invert sugar in amount capable of reacting in the presence of an alkali only in the dye bath to reduce the dye to its soluble leuco state.

2. A dye mixture for bath dyeing in the form of a paste comprising an inert liquid body, a dye in unreduced insoluble state and invert sugar in amount capable of reacting in the presence of an alkali only in the dye bath to reduce the dye to its soluble leuco state.

3. A dye mixture for bath dyeing having the form of a powder and comprising a dye in unreduced insoluble state and invert sugar in amount capable of reacting in the presence of an alkali only in the dye bath to reduce the dye to its soluble leuco state.

4. The process of preparing an aqueous dye bath comprising adding to the bath containing a dye in unreduced insoluble state and alkali, invert sugar in amount capable of reacting with the alkali only in the bath to reduce the dye to its soluble leuco state.

WILEY PAUL BOLEN.